May 8, 1962   J. L. WILLIAMS   3,033,516
GATE VALVE WITH BACK PRESSURE MEANS
Filed June 6, 1958
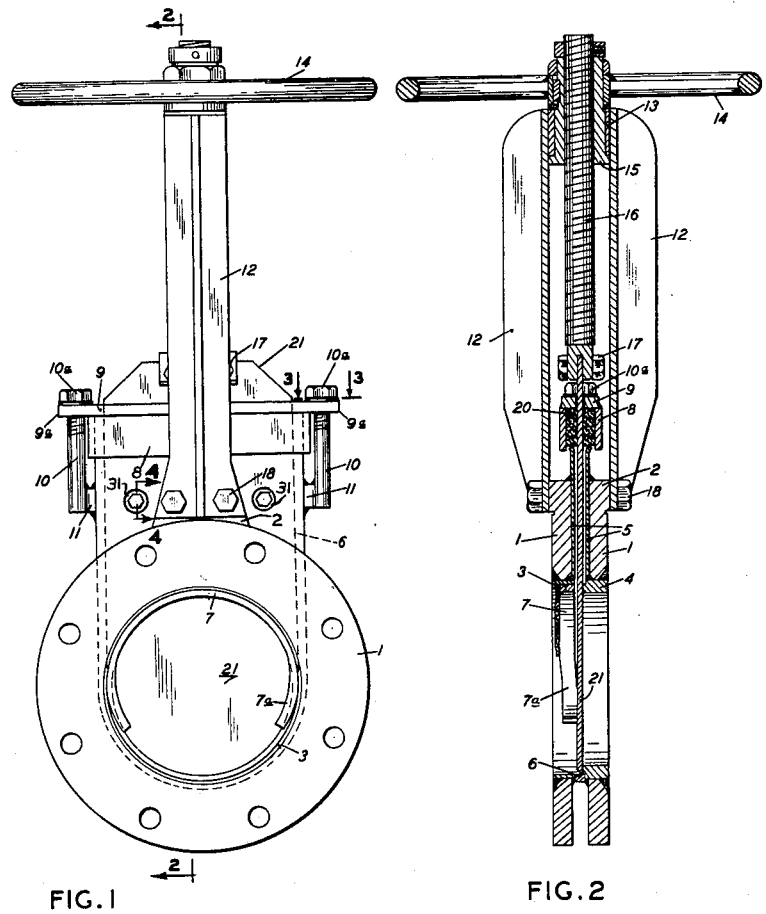
FIG. 1   FIG. 2
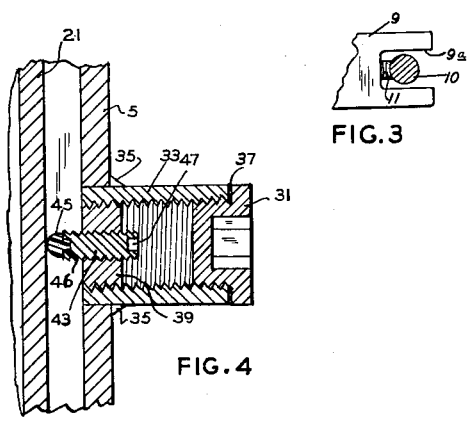
FIG. 3
FIG. 4
INVENTOR
JOHN L. WILLIAMS
BY
BUCKHORN, CHEATHAM & BLORE
ATTORNEYS

3,033,516
GATE VALVE WITH BACK PRESSURE MEANS
John L. Williams, 17467 NE. West View Road,
Portland, Oreg.
Filed June 6, 1958, Ser. No. 740,308
1 Claim. (Cl. 251—187)

This invention relates to gate valves and particularly to gate valves for handling paper stock or like material having fibers which can collect on exposed parts.

In many installations, the pressure between the gate blade and the seat provided by the yieldable backing member of the valve of my co-pending application entitled "Stock Valve Having Yieldable Gate Engaging Elements," Serial No. 423,114, filed April 14, 1954, now abandoned, is sufficient to prevent undesirable leakage against back pressure. By back pressure, it is meant the pressure against the blade on the side thereof remote from the backing member. However, in other installations, the back pressure is higher than in the installations just mentioned and undesired leakage might occur.

It is a main object of the present invention to provide a gate valve having pressure means for holding the gate blade in sealing engagement with the valve seat even against relatively high back pressures.

A further object of the invention is to provide a valve having pressure means of the type described above which is of such small dimensions as to preclude any substantial collection of fibers and which is so located as to avoid the collection of fibers.

A further object of the invention is to provide a valve having a pressure means of the type described above which is mounted for adjustment so that the proper pressure may be applied to the gate blade despite wear of certain contacting parts.

A further object of the invention is to provide a valve of the type just described in which the adjustment can be carried on from the exterior of the valve and without removing the valve from the line.

A still further object of the invention is to provide a valve having pressure means of the type under consideration which may be retracted so that any fibers which have accumulated on the pressure means may be removed therefrom.

It is a further particular object of the invention to provide a pressure means of the type under consideration which engages the gate blade with considerable pressure and yet does not gall the blade.

Various other objects of the present invention will be apparent from the following description taken in connection with the accompanying drawings, wherein:

FIG. 1 is an end elevation of a valve embodying the concepts of the present invention;

FIG. 2 is a vertical midsectional view through the valve disclosed in FIG. 1;

FIG. 3 is a fragmentary view in section taken along lines 3—3 of FIG. 1; and

FIG. 4 is an enlarged fragmentary vertical section taken along lines 4—4 of FIG. 1.

The pressure means of the present invention are disclosed in a very thin type gate valve, but the pressure means may be incorporated in other types of gate valves as well. The general construction of the valve disclosed will first be described and then the details of the pressure means will be set forth.

Referring to the accompanying drawings, the valve includes a pair of annular flanges 1 having a pair of upwardly projecting portions 2 for a purpose to presently appear. A ring 3 is secured within the left-hand flange 1, as the parts are shown in FIG. 2, and a heavier ring 4 is secured within the right-hand flange 1. A pair of valve chest plates 5 are secured on the inner faces of the flanges 1 and have semicircularly recessed lower ends secured to the associated rings 3 and 4. A U-shaped band 6 is secured between the side edges of the valve chest plates 5 and between the lower portions of the rings 3 and 4.

A gate blade 21 projects into the valve body, which valve body may be considered as including the flanges 1, the chest plates 5, the band 6 and the rings 3 and 4. The gate blade has the right-hand side surface thereof, as the parts are depicted in FIG. 2, disposed in sliding sealing engagement with a valve seat provided by the ring 4 to control the flow of fluid through the valve. The rings 3 and 4 together with the band 6 may be considered as providing a fluid passage through the valve.

An arcuate backing member 7 is secured to the inner surface of ring 3 but has free end portions 7a bent to engage the gate blade 21 and press it against the seat provided by the ring 4. This arcuate backing member forms the subject matter of my application entitled "Stock Valve Having Yieldable Gate Engaging Elements," Serial No. 423,114, filed April 14, 1954.

Referring to FIGS. 1 and 4, also pressing the gate against its seat is a pair of pressure mechanisms mounted on the downstream chest plate 5. Each of the mechanisms includes a tubular housing 33 closed by a sealing plug 31. The housing fits within an opening formed in the downstream chest plate 5 and the housing is fastened in place by welds 35. A gasket 37 is preferably provided between the head of the plug 31 and the end of the housing 33 remote from the gate blade.

The housing is internally threaded to threadedly receive a mounting disk 39 which occupies a position at the inner end of the housing. The mounting disk has a central threaded bore threadedly receiving a tubular carrier 43 which extends completely through the mounting disk and has a length greater than the thickness of the mounting disk.

The inner end of the carrier is equipped with a nose piece 45 having a shank portion 46 fitting tightly within a central blind recess in the inner end of the carrier. The shank portion may have a drive fit within the recess or the recess walls may be threaded and the shank threaded or forced into this threaded recess.

The nose piece is formed of a plastic material, such as a tetrafluoroethylene resin, so that there is no galling between the nose piece and the gate blade 21 which the nose piece engages.

The carrier 43 is formed with a noncircular recess 47 in its outer end to receive a wrench or tool by which the position of the nose piece relative to the chest plate 5 may be varied. This regulates the pressure between the nose piece and the gate blade 21 and thus the pressure between the blade 21 and its seat. It is pointed out that this adjustment takes place without removing the valve from the line and in fact without disturbing the operation of the valve. Some liquid my leak past the threaded fit between the mounting disk 39 and the interior of the housing 33, but leakage from the housing is prevented by the plug 31. Thus when the plug 31 is removed to allow adjustment of the nose piece, there may be a small discharge of fluid from the housing, which fluid has accumulated within the housing.

In use, the nose pieces are moved to positions to press the blade with a desired pressure against the valve seat. This pressure can be made to exceed the anticipated back pressure so that no leakage occurs.

In order to prevent the mounting disks from undesirable movement when adjusting the position of the nose piece, the threads at the inner end of the housing may be peened or dented so that the mounting disk is jammed into a fixed position within the housing. It is pointed out that the pressure means are very small and barely exposed and are located in spaced relation from the lower part of the passageway through which the fluid flows. Therefore, there is very little tendency for fibers to collect on the nose plugs or the carriers of the pressure means. Occasionally, the plugs 31 may be removed and the carriers backed off to automatically wipe off any fibers collecting on the carrier or the nose piece.

Another advantage of the pressure means of the present invention is that in some installations the back pressure conditions may vary from time to time. When the back pressure is not high, the nose pieces can be backed off and relieve the pressure on the blade and make it easier to operate the blade. When again it is desired to operate at a relatively high back pressure, the nose pieces may be moved back into pressure engagement with the gate blade to force the gate blade tightly against the valve seat.

Of course, a most important advantage of the pressure means is that as wear occurs on the nose pieces, the nose pieces can be moved inwardly to attain the original pressure of the gate blade against its seat.

While the pressure means of the subject invention are shown in combination with the backing member 7, it is contemplated that the back pressure means may be utilized alone or may be utilized in conjunction with a wedge at the tip of the gate blade.

The other parts of the valve disclosed in the drawings will now be described.

Surrounding the portion of the gate blade projecting from the valve body is a packing box unit, which includes an inverted box provided by a rectangular loop 8 and a top plate 9. The box contains packing 20 which is pressed into engagement with the upper edges of the chest portion of the valve body, that is, in engagement with the upper edges of the chest plates 5 and the upper ends of the U-shaped band 6. Preferably, the upper margins of the chest plates 5 are bent outwardly, as shown in FIG. 2, and it will be noted that these edges are disposed in spaced relation to the box 8, 9. This provides for lateral shifting movement or adjustment of the box relative to the valve body. The just-mentioned edges may be considered as an upstanding rib surrounding the gate blade.

The top plate 9 has end portions projecting outwardly of the valve body and formed with slots 9a through which project studs 10 which are secured at their lower ends by lugs 11 to the valve body. As clearly shown in FIG. 3, there is clearance between the studs 10 and the slots 9a to provide for shifting movement or adjustment of the packing box unit relative to the valve body. Nuts 10a are threaded on the upper ends of the studs 10 and force the packing box unit downwardly to press the packing 20 into engagement with the upper edges of the chest portion of the valve body.

The above-described inverted packing box arrangement constitutes subject matter of my Patent 2,832,564 granted April 29, 1958.

A pair of arms 12 have their lower ends secured by bolts 18 to the upward projecting portions 2 of the valve flanges 1. The upper ends of the arms 12 are connected together by a yoke hub 13, there being a handwheel 14 having a nut 15 rotatably mounted on the hub 13. A valve stem 16 threadedly extends through the nut 15 and is connected by a clevis and bolt arrangement at 17 to the upper end of the gate blade 21.

Having described the invention in what is considered to be the preferred embodiment thereof, it is desired that it be understood that the invention is not to be limited other than by the provisions of the following claim.

I claim:

In a gate valve having a valve body formed with a through flow passage, a seat on said body for said flow passage, a gate blade engaging said seat and movable to and from a position closing said flow passage, said body including a chest defined in part by inlet and outlet walls, means for pressing said blade against said seat, said means including a tubular housing permanently secured at one end to the outlet chest wall, cylindrical means having a dimension parallel to its axis substantially less than that of said tubular housing and being located within said tubular housing at the inner end thereof, a fixed tetrafluoroethylene nose element carried by the inner end of said cylindrical means and engaging said blade, said housing having interior threads formed thereon at least at the inner end thereof and the outer end thereof, said cylindrical means having exterior threads threadedly engaging interior threads of said housing at the inner end of said housing to provide for adjustment of the position of said cylindrical means relative to said tubular housing, said cylindrical means having a tool receiving recess at its outer end to facilitate the adjustment of the position of said nose element from the exterior of said valve at a time when said nose element is in engagement with said blade, a closure plug having exterior threads threadedly engaging interior threads of said housing at the outer end of said tubular housing to prevent fluid which leaks past said cylindrical means from egress from said housing, said plug being removable to permit adjustment of the position of said nose element.

References Cited in the file of this patent

UNITED STATES PATENTS

| | | |
|---|---|---|
| 800,908 | Dexter | Oct. 3, 1905 |
| 1,238,259 | Campbell | Aug. 28, 1917 |
| 1,268,511 | String | June 5, 1918 |
| 1,278,863 | Crusius | Sept. 17, 1918 |
| 1,406,060 | Mueller | Feb. 7, 1922 |
| 1,978,730 | Weber | Oct. 30, 1934 |
| 2,111,560 | Fox | Mar. 22, 1938 |
| 2,842,283 | Smith | July 8, 1958 |

FOREIGN PATENTS

| | | |
|---|---|---|
| 596,871 | France | Oct. 17, 1925 |